May 30, 1944.  F. A. QUICK  2,350,190
LATHE
Filed June 5, 1942
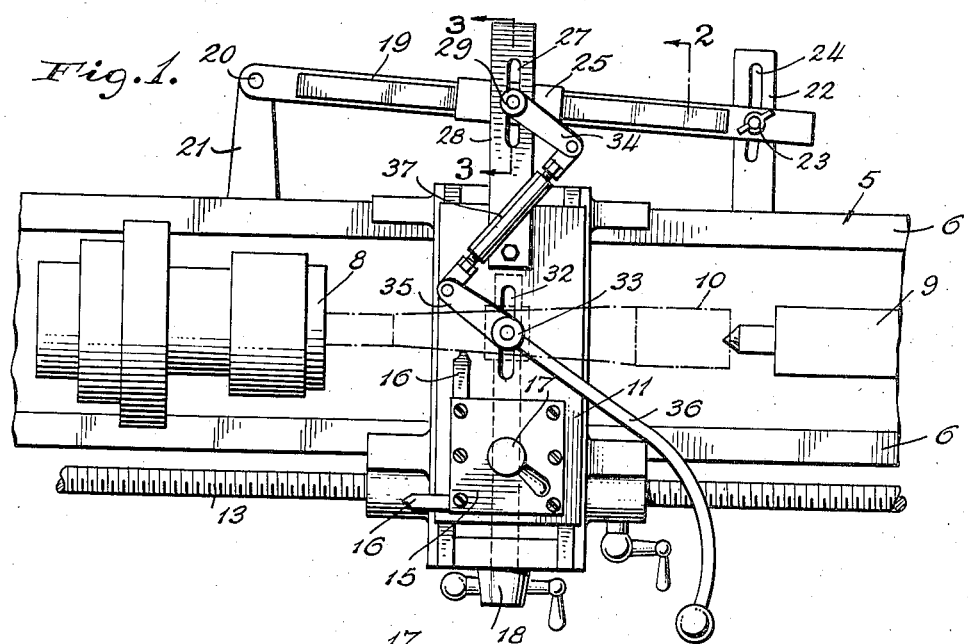
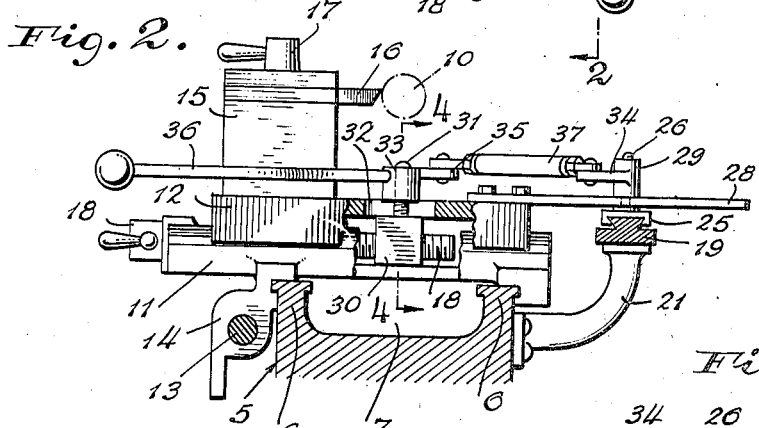
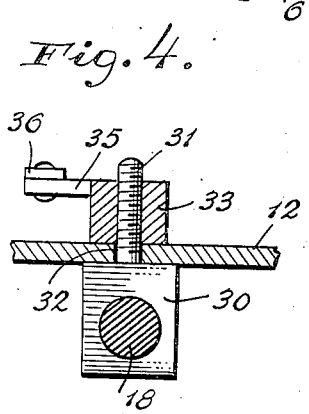
INVENTOR.
FREDERICK A. QUICK
BY
ATTORNEY Patented May 30, 1944

2,350,190

UNITED STATES PATENT OFFICE 2,350,190

LATHE

Frederick A. Quick, Bellerose, N. Y., assignor to All Purpose Gold Corporation, Brooklyn, N. Y., a corporation of New York Application June 5, 1942, Serial No. 445,865

1 Claim. (Cl. 82—17)

This invention relates to improvements in lathes and has particular reference to a mechanism therefor utilized to control changeovers in the type of work to be performed by the lathe.

In certain kinds of lathes, a tool-supporting compound slide and a taper guide are employed in performing different operations upon a piece of work such as, for example, cylindrical and tapering cuts thereon. In such lathes, the slide may consist of two members which may be coupled for unitary movement longitudinally of the work when forming a cylindrical cut, and which may be uncoupled and one of said members connected to the taper guide for coordinated relative movements between said members when making a tapering cut. The coupling and uncoupling of the slide members has been accomplished by means of a follower nut and a clamping screw the former of which is threaded for engagement with the cross feed screw of the lathe and combines with the clamping screw to secure said slide members together for unitary movement in the formation of a cylindrical cut. During such operation, the taper guide is disconnected from one of the slide members, but when a tapering cut in the work is to be performed, said guide is coupled to said slide member, by means of a clamping nut, and said follower nut and its clamping screw have to be removed to uncouple said slide members and thus permit of coordinated relative movements therebetween under the combined control of said taper guide and the longitudinal feed screw of the lathe. Due to the relative inaccessibility of said follower nut and the necessity for disengaging it from said cross feed screw, the operation of removing said nut and again connecting it to said cross feed screw when changing from a cylindrical to a tapering cut, and vice versa, is rather difficult and also time-consuming since the lathe must be stopped when performing such operations.

An object of the present invention is to effect a change-over from one operation of the lathe to another without the necessity of removing and replacing the follower nut associated with the cross feed screw, thereby saving considerable time and labor.

In carrying out the above object, use is made of a control mechanism which is operatively connected in such manner to the coupling device for the two slide members of the compound slide and to the coupling device for one of said members and the taper guide, that when said mechanism is actuated said coupling devices are simultaneously and alternately operated to couple and uncouple the elements with which they are associated.

The inventive idea involved is capable of receiving a variety of mechanical expressions one of which, for purposes of illustration, is shown in the accompanying drawing, wherein:

Fig. 1 is a fragmentary top plan view of a lathe constructed in accordance with the present invention.

Fig. 2 is a transverse sectional view taken substantially on the line 2—2 of Fig. 1.

Fig. 3 is a sectional view on the line 3—3 of Fig. 1, and

Fig. 4 is a similar view on the line 4—4 of Fig. 2.

The type of lathe to which the present invention is adapted is shown as comprising a bed 5 including two longitudinal rails 6 forming a recess 7 therebetween. Above said bed there is supported the usual chuck, conventionally shown at 8, driven from a suitable source of power and cooperating with the tail stock 9 to hold a piece of work 10 for rotation therebetween.

The compound slide or carriage comprises a lower slide member 11 supported on the rails 6 of the bed 5 for longitudinal movement therealong, and an upper slide member 12 mounted above the member 11 for unitary longitudinal movement therewith and also a transverse relative movement with respect thereto, depending upon the nature of the work to be performed as, for example, cylindrical and tapering cuts. The longitudinal movement of the compound slide is accomplished by the longitudinal feed screw 13 engaged with the bearing 14 depending from the slide member 11, and said screw is driven in the customary manner. The upper slide member 12 supports a turret-type tool post 15 adapted to carry one or more tools 16 secured in position on the post by a clamp 17 and brought to operative position relative to the work 10 by a rotation of said post. A cross feed screw 18 having a bearing in the slide member 11 is utilized to manually adjust the upper slide 12 and the post 15 and its tool carried thereby to proper operative position with respect to the work before the lathe is started.

In known types of lathes, this adjustment of the upper slide member 12 is accomplished by means of a follower nut having threaded engagement with the cross feed screw 18, with a portion of said nut projecting through an opening in the slide member 12 and carrying a clamping screw for clamping engagement with the slide member 12 to thereby connect the latter to the screw 18 so that a turning movement of the screw will effect adjustments of the tool 16 toward and away from the work. Said follower nut and its clamping screw also couple together the two slide members 11 and 12 for unitary movement longitudinally of the bed 5 and along the piece of work 10, and when so coupled together and longitudinally moved by the operation of the screw 13 the tool 16 will form a cylindrical cut in said work. However, when it is desired to alter or change over from one type of cut to another, such as from a cylindrical to a tapering cut, it is necessary to stop the lathe, remove the clamping screw from the follower nut and unthread the latter from the cross feed screw, and then remove said follower nut so as to disconnect or uncouple the two slide members 11 and 12 whereby the latter member may have a transverse movement relative to the member 11 as the two members are moved along by the screw 13 in a subsequent operation of the lathe. Such relative transverse movement of the upper slide 12 has been accomplished heretofore, and is effected in the present invention, by means of a taper guide 19 in the form of a bar pivoted at 20 to a bracket 21 extending from the rear of the bed 5, and adjustably joined to a similar bracket 22 by means of a set screw 23 engaged in an arcuate slot 24 formed in the latter bracket, the adjustments of said taper guide being utilized to control the amount of transverse movement of the slide 12 and consequently the degree of taper formed in the work 10. This control is accomplished through the medium of a slide 25 mounted for longitudinal movement on the guide 19 and provided with a screw-threaded shank 26 extending upwardly from the slide through an elongated slot 27 formed in a bar 28 secured to and extending rearwardly from the upper slide member 12. A nut 29 threaded upon the shank 26 and bearing upon the bar 28 is utilized to couple said bar, and consequently the slide member 12, to the slide 25 and disconnect the same therefrom. When the two slide members 11 and 12 are coupled, for cylindrical work, by the previously referred to follower nut and clamping screw, the nut 29 is loosened on the shank 26 so that the slide member 12 and the slide 25 are disconnected, and the latter will be free to move along the bar 28; but when a tapering cut is to be made in the work and the previously referred to follower nut is removed from the cross feed screw 18, the clamping nut 29 is threaded down on the shank 26 so as to operatively connect the slide 25 with the bar 28. Consequently, as the compound slide is moved along the work 10, the slide 25 will likewise be moved along the taper guide 19 and by reason of the fact that said latter slide is now coupled to the bar 28, it will be apparent that a transverse motion will be imparted to the slide member 12 relative to the slide member 11, thus gradually moving the tool 16 away from the work to form a tapering cut thereon. Thus, in the old type of lathe, when a change-over is made in the operation to be performed, two separate adjustments are required, namely, the removal or replacement of the follower nut on the screw 18, and tightening or loosening the nut 29 associated with the slide 25.

In accordance with the present invention, the necessity of the two separate operations above referred to is dispensed with and the alternate coupling or uncoupling of the two slide members 11 and 12, and the coupling or uncoupling of the slide member 12 and the slide 25 are accomplished in a single operation and without requiring the removal of the follower nut. To this end, the follower nut 30 is threaded on the cross feed screw 18 and permanently remains thereon. This nut 30 is provided with a screw-threaded shank 31 which is extended upwardly through an elongated slot 32 now formed in the upper slide member 12 and a clamping nut 33 is threaded on said shank for clamping engagement with and disengagement from said slide member. However, in accordance with the present invention, the nuts 29 and 33 are provided, respectively, with laterally extending arms 34 and 35. The clamping nut 33 also has projecting therefrom an elongated operating handle 36 extending to the front of the machine where it may be readily grasped by the operator of the lathe to turn the nut 33 in a clockwise direction to lower the same on the shank 31 into clamping engagement with the slide member 12, and in reverse direction to loosen the same on said shank. The operation of the handle in either direction is designed to turn the clamping nut 29 in a reverse direction from that of the nut 33 so that when the latter is tightened, the nut 29 is loosened, and vice versa. In order to accomplish this, a connection is provided between arms 34 and 35. This connection is preferably in the form of a turnbuckle 37 which permits of preliminary relative adjustments being made between the arms 34 and 35 to, in turn, control the required amount of turning movements to the nuts 29, 33 to tighten and loosen the same.

From the foregoing description, it will be apparent that when a cylindrical cut is being formed in the work 10, as indicated at the left-hand end thereof, the clamping nut 33 is tightened to couple the slide members 11 and 12 and the clamping nut 29 is loosened so that the shank 26 on which the latter nut is threaded will move freely along the slot 27 and thus no transverse movement will be imparted to the bar 28 and the slide member 12 on which it is mounted. When the change-over in the operation is to be effected, such as a tapering cut in the intermediate portion of the piece of work 10, the lathe need only be momentarily stopped and the operating handle 36 swung in a counterclockwise direction. This movement will loosen the nut 33 from engagement with the slide member 12 and, simultaneously, the arm 34 will be turned in a clockwise direction by the turnbuckle 37, thus threading the nut 29 downwardly on the shank 26 and against the bar 28 so as to couple said bar with the slide 25. Subsequent operation of the lathe will then cause the slide 25 to be moved along the guide 19 and since said slide is now coupled to the bar 28 the slide member 12 will be moved transversely of the work as said slide member is carried along by the lower slide member 11. During this movement the shank 31 of the nut 30 will move freely in the elongated slot 32 of the slide member 12. Obviously, the swinging movement of the operating handle 36 in a reverse direction from that just described will result in the coupling of the slide members 11 and 12 and the uncoupling of the slide 25 from the bar 28.

What is claimed is:

In a lathe, work holding means, a tool-supporting compound slide including two cooperating slide members having unitary longitudinal movement relative to said work when forming a cylindrical cut therein and having movements relative to each other when forming a tapering cut, a taper guide, means including a clamping nut for coupling said slide members together during their unitary movement and for disconnecting the same for relative movements when forming a tapering cut, means including a second clamping nut for coupling said taper guide to one of said slide members during the formation of a tapering cut and for uncoupling said guide and slide member during a cylindrical cutting operation, a turnbuckle connection between said clamping nuts, and an operating lever extending from one of said nuts for turning the same in either direction and for actuating said connection to turn the other nut in a reverse direction from the first nut.

FREDERICK A. QUICK.